United States Patent [19]

Hemling et al.

[11] Patent Number: 5,030,245

[45] Date of Patent: Jul. 9, 1991

[54] ANIONIC POLYCARBOXYLATED SURFACTANTS AS DYE-LEVELING AGENTS USED IN COMBINATION WITH A STAINBLOCKER FOR FIBERS

[75] Inventors: Thomas C. Hemling, Meriden, Conn.; Harry Stitzel, Heath Springs, S.C.

[73] Assignee: Olin Corporation, Cheshire, Conn.

[21] Appl. No.: 403,958

[22] Filed: Sep. 7, 1989

[51] Int. Cl.$^5$ ............... C09B 67/00; C09B 67/26; D06M 15/41; D06M 13/165

[52] U.S. Cl. ............................. 8/560; 8/557; 8/115.51; 8/924; 8/929; 252/174.21; 252/174.22

[58] Field of Search ............ 252/8.8, 8.9, 174.21, 252/174.27; 8/924, 115.51, 527, 560, 557, 929

[56] References Cited

U.S. PATENT DOCUMENTS

| | | | |
|---|---|---|---|
| 3,592,584 | 7/1971 | Link et al. | 8/26 |
| 3,790,344 | 2/1974 | Frickenhaus et al. | 8/165 |
| 3,956,401 | 5/1976 | Scardera et al. | 260/615 B |
| 4,299,994 | 11/1981 | Stahel | 252/8.9 |
| 4,340,385 | 7/1982 | Rodriguez et al. | 8/527 |
| 4,408,995 | 10/1983 | Guth et al. | 8/115.5 |
| 4,533,485 | 8/1985 | O'Connor et al. | 252/156 |
| 4,592,940 | 6/1986 | Blyth et al. | 428/96 |
| 4,619,853 | 10/1986 | Blyth et al. | 428/95 |
| 4,680,212 | 7/1987 | Blyth et al. | 428/97 |
| 4,787,912 | 11/1988 | Abel et al. | 8/924 |
| 4,827,028 | 5/1989 | Scardera et al. | 252/174.21 |
| 4,908,149 | 3/1990 | Moore et al. | 252/139 |

FOREIGN PATENT DOCUMENTS

90/00538 of 1990 PCT Int'l Appl. ............ 252/174.21

OTHER PUBLICATIONS

Application Data Brochure for Poly-Tergent ® CS-1 Sequestering Properties, dated 5/89.

*Primary Examiner*—Paul Lieberman
*Assistant Examiner*—J. E. Darland
*Attorney, Agent, or Firm*—Dale Lynn Carlson

[57] ABSTRACT

The present invention relates to a process for providing dye leveling and stainblocking characteristics to fibers. The use of specified dye-leveling agents in accordance with the present invention allows the treated fibers to be contacted with an acid dye-stainblocker composition in a single step. The invention is particularly suitable for treating nylon, silk and wool fibers.

9 Claims, No Drawings

ANIONIC POLYCARBOXYLATED SURFACTANTS AS DYE-LEVELING AGENTS USED IN COMBINATION WITH A STAINBLOCKER FOR FIBERS

A common problem encountered when dyeing natural and synthetic fibers, such as wool fibers or polyamide fibers, is the tendency of the dye to provide uneven coloration of the fiber. In essence, the dye more rapidly reacts at the point of initial contact with the fiber, thus giving an uneven appearance to the dyed fiber. This problem is accentuated when several dyes are utilized to produce a desired shading on the fiber. For example, the dyes may react at different rates to produce a separation of colors at different points along the fiber.

To alleviate the above problems, various materials have been suggested in the past to provide level fiber dyeing. These materials, commonly referred to as "dye-leveling agents", have in the past frequently been selected from the class referred to as anionic surfactants. By way of illustration, alkyl diphenyloxide disulfonate has been used commercially as an acid dye-leveling agent. However, this disulfonate has the disadvantage of providing higher foaming and poorer wetting than might be desired, as well as being limited in its usefulness to a relatively narrow pH range. Accordingly, new dye-leveling agents for acid dyestuffs for natural and synthetic fibers such as wool, silk, and polyamide would be highly desired by the fiber dyeing community.

The present invention relates to a process for providing dye leveling and stainblocking to fibers which comprises:

(a) contacting a polyamide-containing fiber with a dye-leveling agent characterized by the empirical structural formula:

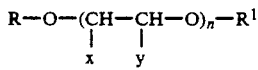

wherein R is a substituted or unsubstituted hydrocarbon radical having between about 6 and about 18 carbon atoms, wherein x and y are independently selected from the group consisting of hydrogen, methyl, and succinic acid radicals, with the proviso that at least one x or y moiety per molecule is a succinic acid radical, wherein n has a value of between 1 and 25, and wherein $R^1$ is hydrogen or a substituted or unsubstituted hydrocarbon having between 1 and 8 carbon atoms, to provide a treated fiber, having said dye-leveling agent on the outer surface thereof, and (b) contacting said treated fiber with a composition comprising an acid dye, and a stainblocking effective amount of stainblocker, wherein said stainblocker is a sulfonated phenol-formaldehyde-diphenylsulfone condensate characterized by repeating units of the empirical structural formula:

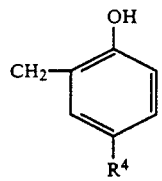

where $R^4$ is the same or different in each unit and is hydrogen or a radical selected from the group consisting of —$SO_3X$,

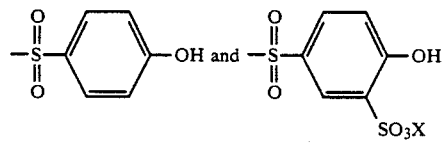

with the proviso that at least 40 percent of the total units contains —$SO_3X$ radical and at least 40 percent of the total units contain the

linkage, wherein X is H or a cation, e.g. $NH_3$, Na, K, etc.

In another aspect, the present invention relates to combining the above steps (a) and (b) to provide dye leveling and stainblocking and dyeing to a fiber in a single step.

These and other aspects will become apparent upon reading the following detailed description of the invention.

The stainblocker useful in the process of the present invention is typically applied to the fiber in a "stainblocking effective amount". The term "stainblocking effective amount" designates an amount sufficient to provide at least some degree of staining-resistance to the fiber. Preferably, the stainblocker is employed in an amount of between about 0.05 and about 5.0 percent based upon the weight of the goods.

In accordance with the process of the present invention it has been surprisingly found by the present inventors that the treatment of fibers with the dye-leveling agents of the present invention enable the treated fibers to be subsequently contacted with an acid dye/stainblocker composition in a single bath. Heretofore, the acid dye was applied to fibers using a separate composition from the stainblocker composition based upon different pH requirements for the acid-dye and stainblocker. Thus, in accordance with the present invention, a single bath can be used to provide both acid-dyeing and stainblocking of fibers, whereas in the past two baths were required.

The dye-leveling agents useful in the process of the present invention are useful in combination with acid dyes (or so-called "acid dyestuffs"). These acid dyes are typically applied to polyamide-containing natural or synthetic fibers such as nylon, wool, and silk.

Suitable fiber materials made from synthetic polyamide, which can be dyed using the process according to the invention, are, e.g., condensation products from hexamethylenediamine and adipic acid (Polyamide 6.6)

or sebacic acid (Polyamide 6.10) or mixed condensation products, e.g. from hexamethylenediamine, adipic acid and E-caprolactam (Polyamide 6.6/6), also the polymerization products from E-caprolactam, known under the tradenames of Polyamide 6, "Perlon", "Grilon" or "Enkalon", or w-aminoundecanoic acid (Polyamide 11 or "Rilsan"). These fibers can be treated with the compositions of the present invention at any stage of processing, that is to say, e.g. in the form of threads, yarns, knitted goods, and fabrics.

The dye-leveling agents useful in accordance with the present invention are typically applied to the fiber in a "dye-leveling effective amount". As used herein, the term "dye-leveling effective amount" designates an amount sufficient to provide an even dye appearance on the fiber upon application of dye to the fiber. Preferably, the dye-leveling agent is applied to the fiber in an amount of between about 0.5 and about 5 weight percent (preferably between about 1 and about 4 weight percent) based upon the total weight of the goods being dyed. The preferred dye-leveling agents contain blocks of both poly(propylene oxide) and poly(ethylene oxide) in the backbone thereof. The preferred dye-leveling agents are commercially available as POLY-TERGENT CS-1. The dye-leveling agent is optionally prepared as a concentrate having a pH of between about 8 and about 9, and is subsequently optionally added to a "working" dye bath having a pH of between about 2.5 and about 7.

A dye-leveling agent/wetting agent blend optionally employed in the present invention suitably employs a low-foaming wetting agent in an amount sufficient to provide effective fiber wetting for subsequent coloration by contact of the fiber with a dye. Illustrative examples of useful wetting agents are alcohol ethoxylates (such as ANTAROX LF-330), propylene oxide capped alcohol ethoxylates (such as TERGITOL MINIFOAM 28), and modified alkylphenol alkoxylates (such as TRITION CF-10).

Preferred wetting agents within the above-identified class of alkoxylated linear alcohols are those specified in U.S. Pat. No. 3,956,401, the disclosure of which is incorporated herein by reference in its entirety. The preferred wetting agents are those identified by the formula:

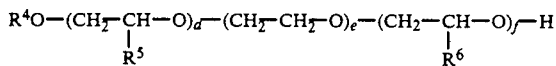

$$R^4O-(CH_2-CH-O)_d-(CH_2-CH_2-O)_e-(CH_2-CH-O)_f-H$$
$$\quad\quad\quad\quad | \quad\quad\quad\quad\quad\quad\quad\quad\quad\quad\quad\quad | $$
$$\quad\quad\quad\quad R^5 \quad\quad\quad\quad\quad\quad\quad\quad\quad\quad\quad\quad R^6$$

wherein $R^4$ is a linear, alkyl hydrocarbon having an average of from about 7 to about 10 carbon atoms, $R^5$ is a linear, alkyl hydrocarbon of about 1 to about 4 carbon atoms, $R^6$ is a linear, alkyl hydrocarbon of about 1 to about 4 carbon atoms, d is an integer of about 1 to about 6, e is an integer of about 4 to about 15, and f is an integer of about 4 to about 25.

The wetting agent is suitably employed in an amount of between about 0.05 weight percent and about 5 weight percent, preferably between about 0.1 weight percent and about 1 weight percent, based upon the total weight of the goods to be dyed. The amount of acid dye-leveling agent used is generally between about 30 and about 70 weight percent based upon the total weight of the dye-leveling agent plus the wetting agent utilized.

The dye-leveling agent/wetting agent blend, if used, preferably also contains a solvent, suitably an alcohol, glycol or ether, such as methanol, butanol, diethylene glycol, tetrahydrofuran, or propylene glycol monoethyl ether or the like. If used, the solvent is employed in an amount of between 10 and about 50 weight percent (preferably between 10 and 40 weight percent) based upon the total weight of the formulation.

When used, the dye-leveling agent/wetting agent blend preferably is neutralized to convert at least a portion of the acid groups on the dye-leveling component to salts. Conventional neutralizing agents are suitably employed such as, for example, ammonia, mono-, di- and tri-ethanol amines, sodium hydroxide, and potassium hydroxide. The preferred neutralizing agent is potassium hydroxide which gives a clear, stable mixture. Neutralization is suitably and preferably carried out to provide a pH for the dye-leveling agent/wetting agent blend of between about 2 and about 9, more preferably between about 5 and about 7.

Acid dyestuffs, suitable for use in accordance with the invention, can belong to very diverse classes of dyestuffs. These can be, for example, the commercially important dyestuff classes of the azo, anthraquinone, phthalocyanine, nitro, or formazane dyestuffs which can also contain metals bound in complex linkage such as copper, nickel, chromium, or cobalt. Suitable azo dyestuffs are, principally, monoazo dyestuffs, e.g. of the type phenylazobenzene, phenylazonaphthalene, phenylazohydrox- or aminopyrazole, phenylazoacyloacetyl-arylamide, or those of the analogous naphthylazo series, whereby the aromatic nuclei can be suitably substituted. Also suitable are bis- and polyazo dyestuffs. The azo dyestuffs, to which also belong the formazane dyestuffs, can be metallized, principally by chromium or cobalt, but also by copper or nickel, whereby 1 or 2 dyestuff molecules per metal ion participate in the complex.

Typically, the acid dye is utilized in a "dye effective amount", i.e., an amount sufficient to cause a desired coloration of the fiber. Preferably, the acid dye is used in an amount of between about 0.1 and about 10.0 weight percent, based upon the total weight of the goods.

In accordance with the present invention, it has now been surprisingly found that the addition products of maleic acid, fumaric acid, itaconic acid, or mixtures thereof, with a select poly(alkoxylated) alcohol provides a surfactant having an excellent dye-leveling property for acid dyes. This surfactant is produced by a straightforward, relatively fast, free radical addition reaction.

While the present invention is not to be limited, this free radical initiated addition reaction is believed to occur by a three-step mechanism, which is illustrated by the following Equations (I) through (VIII) wherein the poly(ethoxylated) alcohol employed is represented by A; one of the selected acids is represented by B; and the peroxy-type free radical initiator is represented by ROOR:

Initiation:
$$ROOR \longrightarrow 2RO \cdot \quad\quad (I)$$

Propogation:
$$A + RO \cdot \longrightarrow A \cdot + ROH \quad\quad (II)$$
$$A \cdot + B \longrightarrow A-B \cdot \quad\quad (III)$$
$$A-B \cdot + A \longrightarrow A-B + A \cdot \quad\quad (IV)$$
$$A-B \cdot + ROH \longrightarrow A-B + RO \cdot \quad\quad (V)$$

-continued

Termination:

$$A\cdot + A\cdot \longrightarrow A\text{—}A \quad (VI)$$
$$AB\cdot + A\cdot \longrightarrow A\text{—}B\text{—}A \quad (VII)$$
$$AB\cdot + AB\cdot \longrightarrow ABBA \quad (VIII)$$

Maleic acid, fumaric acid and mixtures thereof [maleic acid being [cis—HOOCCH—CHCOOH] and fumaric acid being (trans—HOOCCH—CHCOOH)], are suitable ethylenically unsaturated dicarboxylic acids since they do not readily homopolymerize under the reaction conditions of the present invention. Free radical addition reactions with them are completed by removal of a hydrogen from another poly(alkoxylated) alcohol [see Equation (IV) above]or from another hydrogen atom source.

In preparing the dye-leveling agents useful in the present invention, the dicarboxylic acid reacts with the poly(alkoxylated) alcohol to form the addition product by replacing a hydrogen on at least one of the carbons on at least one of the ethylene oxide or propylene oxide moieties. It is preferred to limit the number of carboxylic acid groups that add to each molecule of alcohol to a small fraction of the theoretical number of bonding sites. Generally, the number of acid groups per ethoxy group on the alcohol in the reaction mixture will be between about 0.05 and about 1, preferably between about 0.2 and about 0.6, more preferably between about 0.4 and about 0.6.

Poly(alkoxylated) alcohols may be made by methods analogous to those described in U.S. Patent No. 3,340,309 at column 3. The disclosure of this patent is incorporated herein by reference in its entirety. Generally, poly(alkoxylated) alcohols may be made by condensing an aliphatic alcohol, or mixture of alcohols, of the desired average chain length, with ethylene oxide or propylene oxide or an ethylene oxide/propylene oxide mixture. The methods used for condensing may be any of the well-known methods described in the art. Preferably, the reaction to make the intermediate occurs at elevated temperatures in the range of about 140° C. to about 200° C. (more preferably from about 160° C. to 180° C.) It is also preferred to carry out such reactions in the presence of an effective amount (e.g. about 0.005 percent to 1 percent by weight of the alcohol weight) of a suitable alkaline catalyst(s) such as salts or hydroxides of the alkali metals or alkaline earth metals. The preferred catalyst is KOH. Various methods for making poly(ethoxylated) alcohols are known and many of these intermediates are commercially available.

The R moiety on the poly(alkoxylated) alcohols is suitably a branched or straight-chain alkyl, aryl or aralkyl hydrocarbon radical having an average number of carbons as specified above. Typically, R will comprise a hydrophobic mixture of hydrocarbon radicals such as a $C_9$–$C_{11}$ mixture, a $C_{12}$–$C_{15}$ mixture or a $C_{16}$–$C_{18}$ mixture. In contrast, the R1 moiety is generally either a hydrophilic or hydrophobic moiety having a short carbon chain length such as methyl, octyl, acetyl, sec-butyl, or alternatively, a hydrogen moiety. Alternatively, $R^1$ can be a substituted hydrocarbon such as benzylsulfonate, methylphosphate or ethylsulfonate.

In fabricating the dye-leveling agents of the present invention, it should be noted that peroxy-type free radical initiators are preferred. Other types of initiators are less preferred for this reaction. Typical peroxy-type free radical initiators include hydrogen peroxide and organo peroxides and hydroperoxides such as dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, dialphacumyl peroxide, dipropyl peroxide, diisopropyl peroxide, isopropyl-t-butyl peroxide, butyl-t-butyl peroxide, dilauryl peroxide, difuroyl peroxide, ditriphenylmethyl peroxide, bis(p-methoxybenzoyl) peroxide, p-monomethoxybenzoyl peroxide, rubrene peroxide, ascaridol, t-butylperoxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, 2,5-di-methyl-2,5-bis(2-ethyl hexanoyl peroxy)hexane, 1,1-bis(t-butylperoxy) cyclohexane and t-butyl perbenzoate.

As stated above, the weight ratio of the total poly(oxyalkylated) alcohol(s) to the unsaturated dicarboxylic acid employed in the addition reaction is generally between about 95:5 and about 40:60 (preferably between about 90:10 and about 50:50). When less than about 5 parts by weight of the acid is used per about 95 parts of the alcohol, the resulting composition is not expected to provide dye-leveling efficacy. When more than about 50 parts by weight of the acid is employed per about 50 parts of the alcohol, a significant portion of the acid will frequently not react onto the alcohol due to stearic hindrance of reactive sites depending upon the specific structure of the alcohol.

The reaction conditions employed in fabricating the dye-leveling agents are not critical to the present invention and the present process should not be limited to any particular conditions. It is preferred to carry out the addition reaction at a temperature of between about 25° C. and about 150° C. More preferably, the reaction temperature may be in the range of between about 80° C. and about 150° C. The reaction temperature should be high enough to activate the peroxy-type free radical initiator for this reaction. In some cases, it may be desirable to add a free radical accelerator such as ferrocene or a Redox catalyst to speed up the reaction. The reaction time will depend mainly upon the reaction temperature used, the specific alcohol reactant employed, and the molar ratio of acid to alcohol desired to be reacted. Suitable reaction times will range from ½ hour up to about 25 hours, preferably between ½ hour and 5 hours. The reaction may be monitored by following the disappearance of the acid or anhydride in the reaction mixture using conventional analysis techniques.

Generally, this reaction is carried out without a solvent. However, in some cases, it may be desirable to employ an organic solvent. For example, if a very viscous poly(oxyalkylated) alcohol is employed, it may be desirable to thin the reaction mixture by using an organic solvent or aqueous emulsion polymerization to facilitate the reaction.

Reaction pressure can be selected as desired. Typically, super- or sub-atmospheric reaction pressure is not necessary for the present reaction. Atmospheric pressure is preferred in order to avoid the expense of special reaction vessels. However, elevated pressures can be used, if desired, and these superatmospheric pressures of up to 10 atmospheres or higher are suitably utilized to drive the reaction to completion and thereby reduce the reaction time.

The free radical initiated reaction of this invention may be conducted under conditions known to be suitable for free radical polymerizations. The reaction is advantageously carried out by mixing the reactants, initiator(s), and optionally with a free radical accelerator(s) and solvent, at temperatures from about 25° C. to about 150° C. with an inert atmosphere (e.g., under a nitrogen blanket) until the reaction is complete. The initiator(s) and optional catalyst(s) and solvent may be added at the beginning of the reaction or may be added portionwise at intervals during the course of reaction. Likewise, the unsaturated acid reactant(s) and the poly(oxyalkylated) alcohol(s) reactants may be brought together at the beginning of the reaction or may be combined in increments as the reaction proceeds.

The adducts produced by this reaction are generally water-insoluble, but they may be converted into water-dispersible or water-soluble form by reaction with a conventional neutralization agent (e.g. an inorganic or organic base) which converts some or all of the carboxylic acids groups into ionic groups.

Thus, the formed addition product is neutralized in accordance with this invention in order to convert at least a major portion (i.e., at least 50 percent) of the carboxylic acid groups on the addition product into ionic groups.

Any conventional neutralizing agent may be employed. Preferred agents include water soluble primary, secondary, or tertiary amines (e.g. triethanolamine), alkali metal hydroxides and mixtures thereof. The most preferred neutralization agents are sodium hydroxide and potassium hydroxide.

The amount of neutralization agent added is preferably sufficient to convert at least about 95 percent of the carboxylic acid groups in the addition product to salt groups (e.g., —COO$^-$Na$^+$). The presence of these salt groups allows the composition to be alkali- and water-soluble. It should be noted that the neutralization agent may also be a alkali-containing processing bath or the like in which the surfactant is to be used. In this latter case, it may be desirable to merely add the unneutralized (or free-acid) adduct of the present invention and allow the neutralization to take place in-situ. Alternatively, unneutralized adducts may be used.

The dye-leveling agents and blends of the present invention are suitably used in compositions containing optional components. Suitable optional components include, for example, pH adjustment additives such as phosphoric or acetic acid; buffering agents such as monosodium phosphate; and sequestering agents such as ethylenediamine tetraacetic acid (EDTA) or its sodium salts.

The advantageous properties of the surfactant compositions of the present invention make them suitable for use in the acid dye-leveling of fibers, particularly silk, wool, and polyamide fibers, including carpets and upholstery fabrics.

The following examples are intended to illustrate, but in no way limit the scope of, the present invention.

EXAMPLE 1

Single Step Dye/Stainblocker Application

In a one liter beaker, a 600 ml aqueous solution was prepared containing 4 percent (O.W.G.) MESITOL MBS (sulfonated phenol-formaldehyde-diphenylsulfone condensate stainblocker available from Dupont), 3 percent (O.W.G.) of a dye-leveling agent/wetting agent blend, and a 0.6 percent (O.W.G.) dye solution made using 0.1 percent Orange 3G, 0.1 percent Red 2B, and 0.4 percent Blue 4R dyes. The dye-leveling agent/wetting agent blend contained 35.5 weight percent of Olin's POLY-TERGENT®CS-1 surfactant as the dye-leveling agent, 35.5 weight percent of Olin's POLY-TERGENT®S-405LF surfactant as the wetting agent, 24 weight percent of isopropyl alcohol, and 5 weight percent of potassium hydroxide, based upon the weight of the blend. The solution pH was adjusted to 6.0 with citric acid. A 10 gram square of nylon carpeting was placed in the bath which is then stirred and heated to boil (16 minutes). The dye bath was maintained at boil for an additional 8 minutes. The dyed nylon sample was rinsed, dried, and tested for resistance to staining by acid dyes using a standard Kool-Aid test. The dyed carpet sample visually exhibited good dye leveling, full shade development, and excellent acid dye stain resistance.

EXAMPLE 2

Single Step Dye/Stainblocker Application at a Lower pH

A 10 gram nylon carpet square was dyed in the same manner and using the same composition as described in Example 1 except that the pH was adjusted to 2.5 using citric acid. The dyed nylon carpet sample showed good dye leveling, full dye development, and excellent acid dye stain resistance.

EXAMPLE 3

Single Step Dye/Stainblocker Application Employing Another Stainblocker

A 10 gram nylon carpet square was dyed in the same manner and using the same composition as described in Example 1 except that 4 percent (O.W.G.) ERINOL PA (Ciba-Geigy) was used as the stainblocking agent instead of MESITOL MBS. The dyed carpet showed good dye leveling, excellent light-fastness, and resistance to staining by acid dyes.

EXAMPLE 4

Single Step Dye/Stainblocker Application Employing Yet Another Stainblocker

A 10 gram nylon carpet square was dyed in the same manner and using the same composition as described in Example 1, except that 4 percent O. W.G.) INTERATEX N (Crompton & Knowles) was used as the stainblocking agent. The dyed fabric showed excellent dye leveling, light-fastness, and stainblocking.

COMPARATIVE EXAMPLE A

Single Step Dye/Stainblocker Application Using A Commercial Dye-leveling Agent

A 10 gram nylon carpet square was dyed in the same manner and using the same composition as described in Example 1, except that 3 percent (O.W.G.) DOWFAX®2A1 (Dow Chemical) was used as the dye-leveling agent. After the standard 24 minute treatment time, the nylon did not develop a full dye shade.

As used in the above examples, the term "O.W.G." denotes "on the weight of the goods" which was nylon carpet in the examples.

What is claimed is:

1. A process for providing dye leveling and stainblocking to fibers which comprises:
   (a) contacting a polyamide-containing fiber with a dye-leveling effective amount of a dye-leveling agent characterized by the empirical structural formula:

$$R-O-(CH-CH-O)_n-R^1$$
   $$\quad\quad\quad\;\;\;|\quad\;|$$
   $$\quad\quad\quad\;\;\;x\quad y$$

wherein R is a hydrocarbon radical having between about 6 and about 18 carbon atoms,
   wherein x and y are independently selected from the group consisting of hydrogen, methyl, and succinic acid radicals, with the proviso that at least one x or y moiety per molecule is a succinic acid radical,
   wherein n has a value of between 1 and 25, and
   wherein $R^1$ is hydrogen or a hydrocarbon having between 1 and 8 carbon atoms, to provide a treated fiber, having said dye-leveling agent on the other surface thereof, and
   (b) contacting said treated fiber with a composition comprising an acid dyeing effective amount of an acid dye selected from the group consisting of azo, anthraquinone, phthalocyanine, nitro, and formazane dyes and a stainblocking effective amount of stainblocker wherein said stain blocker is a sulfonated phenol-formaldehydediphenylsulfone condensate characterized by repeating units of the empirical structural formula:

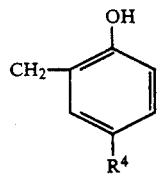

where $R^4$ is the same or different in each unit and is hydrogen or a radical selected from the group consisting of —$SO_3X$,

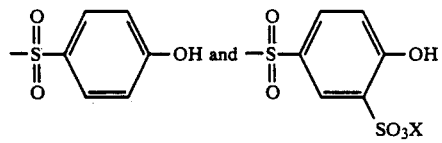

with the proviso that at least 40 percent of the total units contains —$SO_3X$ radical and at least 40 percent of the total units contain the

linkage, wherein X is H or a cation.

2. The process of claim 1 wherein said dye-leveling agent is applied to said fiber in an amount of between about 0.5 and about 5 weight percent based upon the total weight of said fiber.

3. The process of claim 1 wherein said dye-leveling agent is applied to said fiber in an amount of between about 1 and about 4 weight percent based upon the total weight of said fiber.

4. The process of claim 1 wherein said composition additionally contains a wetting agent identified by the following empirical structural formula:

$$R^2-(PO)_w-(EO)_z-R^3$$

wherein $R^2$ is a hydrocarbon radical having between about 6 and about 18 carbon atoms, wherein $R^3$ is either a poly(propylene oxide) containing between about 4 and about 25 propylene oxide groups or is a hydrocarbon radical having between 2 and about 8 carbon atoms, and wherein W has a value of between 0 and 25 and z has a value of between 4 and 25.

5. The process of claim 1 which additionally contains a wetting agent and wherein said wetting agent has the following structural formula:

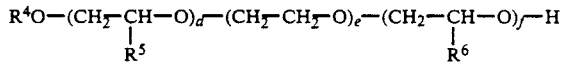

wherein $R^4$ is a linear, alkyl hydrocarbon having an average of from about 7 to about 10 carbon atoms, $R^5$ is a linear, alkyl hydrocarbon of about 1 to about 4 carbon atoms, $R^6$ is a linear, alkyl hydrocarbon of about 1 to about 4 carbon atoms, d is an integer of about 1 to about 6, e is an integer of about 4 to about 15, and f is an integer of about 4 to about 25.

6. The process of claim 4 wherein said wetting agent is employed in an amount of between about 0.05 and about 5 weight percent based upon the total weight of the fiber to the dyed.

7. The process of claim 1 wherein said acid dye is employed in an amount of between about 0.1 and about 10 weight percent based upon the total weight of the fiber to be dyed.

8. The process of claim 1 wherein said stainblocker is employed in an amount of between about 0.05 and about 5.0 weight percent based upon the total weight of said fiber.

9. The process of claim 1 wherein steps (a) and (b) are carried out simultaneously in a single step.

* * * * *